United States Patent
Inoue et al.

(10) Patent No.: US 8,407,293 B2
(45) Date of Patent: Mar. 26, 2013

(54) PRINT SERVICE SYSTEM

(75) Inventors: Hiroshi Inoue, Tokyo (JP); Kazutomo Tawa, Tokyo (JP); Yutaka Kangoori, Tokyo (JP); Fumitada Yoshino, Tokyo (JP); Masaki Omata, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 1473 days.

(21) Appl. No.: 10/611,962

(22) Filed: Jul. 3, 2003

(65) Prior Publication Data
US 2004/0107257 A1   Jun. 3, 2004

(30) Foreign Application Priority Data
Nov. 28, 2002   (JP) ................. 2002-345639

(51) Int. Cl.
*G06F 15/16* (2006.01)
(52) U.S. Cl. ........................ 709/206; 709/207
(58) Field of Classification Search .................. 709/206, 709/219, 218, 213; 358/1.1, 402; 705/14
See application file for complete search history.

(56) References Cited

U.S. PATENT DOCUMENTS

| | | | | |
|---|---|---|---|---|
| 46,247 | A * | 2/1865 | Iwase et al. ...................... | 156/57 |
| 73,343 | A * | 1/1868 | Ziskind et al. .................. | 83/705 |
| 78,159 | A * | 5/1868 | Petrogiannis et al. ............. | 62/4 |
| 126,160 | A * | 4/1872 | Miyata et al. .................. | 451/436 |
| 5,732,137 | A * | 3/1998 | Aziz ............................. | 713/155 |
| 6,133,985 | A | 10/2000 | Garfinkle et al. | |
| 6,789,113 | B1 * | 9/2004 | Tanaka .......................... | 709/223 |
| 6,877,031 | B2 * | 4/2005 | Watanabe et al. ............. | 709/217 |
| 2002/0001099 | A1 | 1/2002 | Okuda et al. | |
| 2002/0013869 | A1 | 1/2002 | Taniguchi et al. | |
| 2002/0046247 | A1 * | 4/2002 | Iwase et al. ................... | 709/206 |
| 2002/0059383 | A1 | 5/2002 | Katsuda | |
| 2002/0065101 | A1 | 5/2002 | Picoult et al. | |
| 2002/0078159 | A1 * | 6/2002 | Petrogiannis et al. ........ | 709/206 |
| 2002/0120757 | A1 * | 8/2002 | Sutherland et al. ........... | 709/229 |
| 2002/0126160 | A1 | 9/2002 | Miyata et al. | |

(Continued)

FOREIGN PATENT DOCUMENTS

| CN | 1339902 | 3/2002 |
|---|---|---|
| EP | 1 320 250 A1 | 6/2003 |

(Continued)

OTHER PUBLICATIONS

Patent Abstract of Japan Publicatin No. 2002-041910; Date of publication Feb. 8, 2002 (Abstract only).

*Primary Examiner* — Kenny Lin
*Assistant Examiner* — Gerald Smarth
(74) *Attorney, Agent, or Firm* — Birch, Stewart, Kolasch & Birch, LLP

(57) ABSTRACT

A mail server has a mail receiving section for receiving an electronic mail including attached image data transmitted from a user through Internet, a print user designation managing section for making a user ID and a password for the corresponding user and transmitting them, and a data accumulating unit for making a user directory for each user ID and storing image data therein. When the user ID and the password are inputted from a touch panel by the user, one or more print terminals download the image data from the data accumulating unit through the Internet in order to print the image data. A usage guide including information related to an installation location of the print terminal is provided to the user in a web site (usage guide site).

10 Claims, 7 Drawing Sheets

U.S. PATENT DOCUMENTS

| | | | |
|---|---|---|---|
| 2002/0138313 A1* | 9/2002 | Fujii et al. | 705/5 |
| 2003/0072031 A1* | 4/2003 | Kuwata et al. | 358/1.15 |
| 2003/0126259 A1* | 7/2003 | Yoshida et al. | 709/225 |
| 2003/0208555 A1* | 11/2003 | Hong et al. | 709/217 |
| 2004/0024846 A1* | 2/2004 | Randall et al. | 709/219 |
| 2004/0049696 A1* | 3/2004 | Baker et al. | 713/201 |
| 2004/0054584 A1* | 3/2004 | Boon | 705/14 |
| 2004/0073684 A1* | 4/2004 | Jodra et al. | 709/228 |
| 2006/0082807 A1* | 4/2006 | Tanaka et al. | 358/1.15 |
| 2007/0035763 A1* | 2/2007 | Bard et al. | 358/1.15 |

FOREIGN PATENT DOCUMENTS

| | | |
|---|---|---|
| JP | 2001-236271 A | 8/2001 |
| JP | 2001-243383 | 9/2001 |
| JP | 2002-041422 A | 2/2002 |

* cited by examiner

FIG. 3A

From:ayu@mp.ne.jp
To: go@degipri.jp
SUBJECT: UKKIE
ATTACHMENT: SH0001JPG

FIG. 3B

From:xxx@degipri.jp
To: ayu@mp.ne.jp
Body: PRINT RESERVATION RECEIVED
  ID:614523
  PASSWORD: 9909

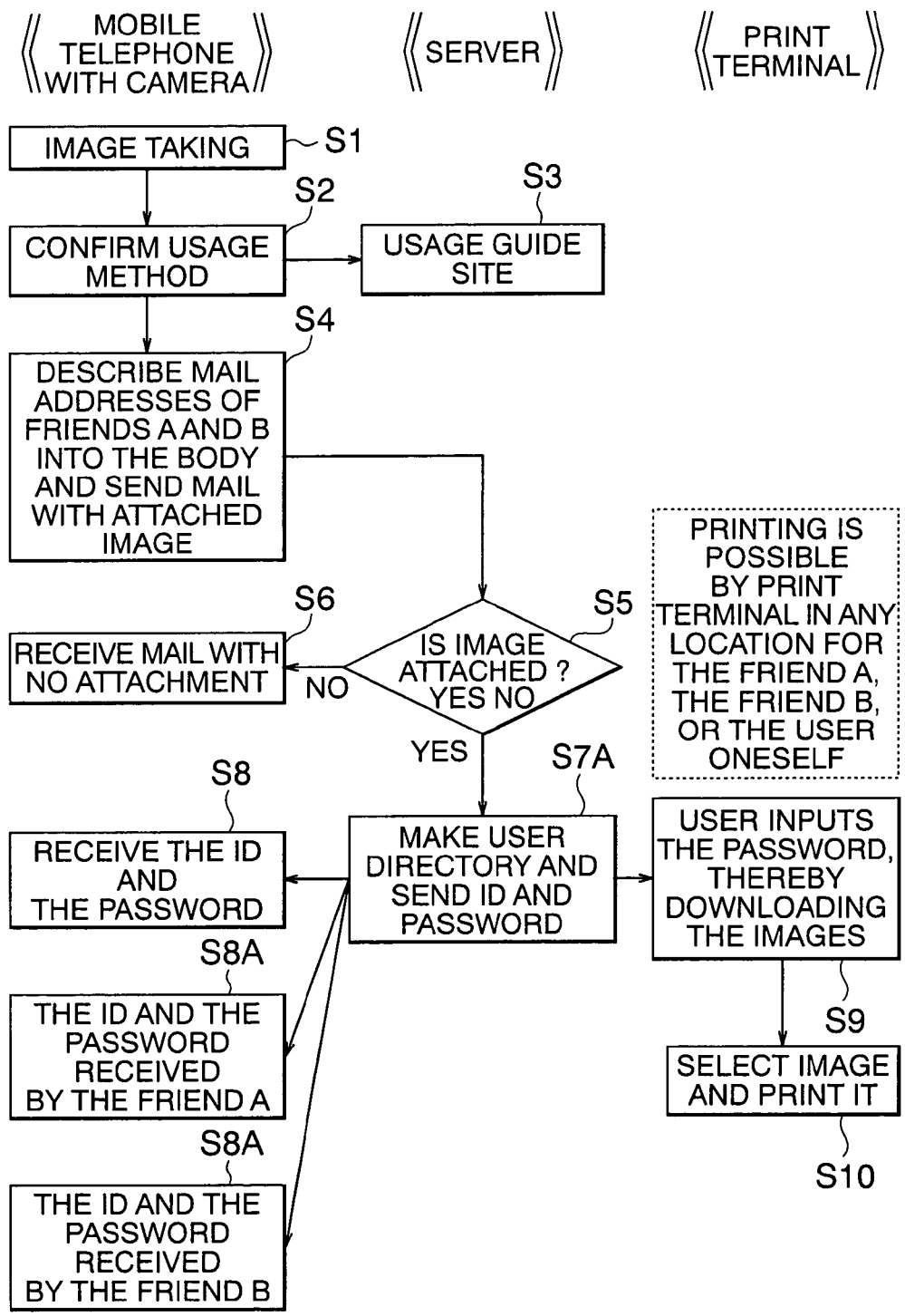

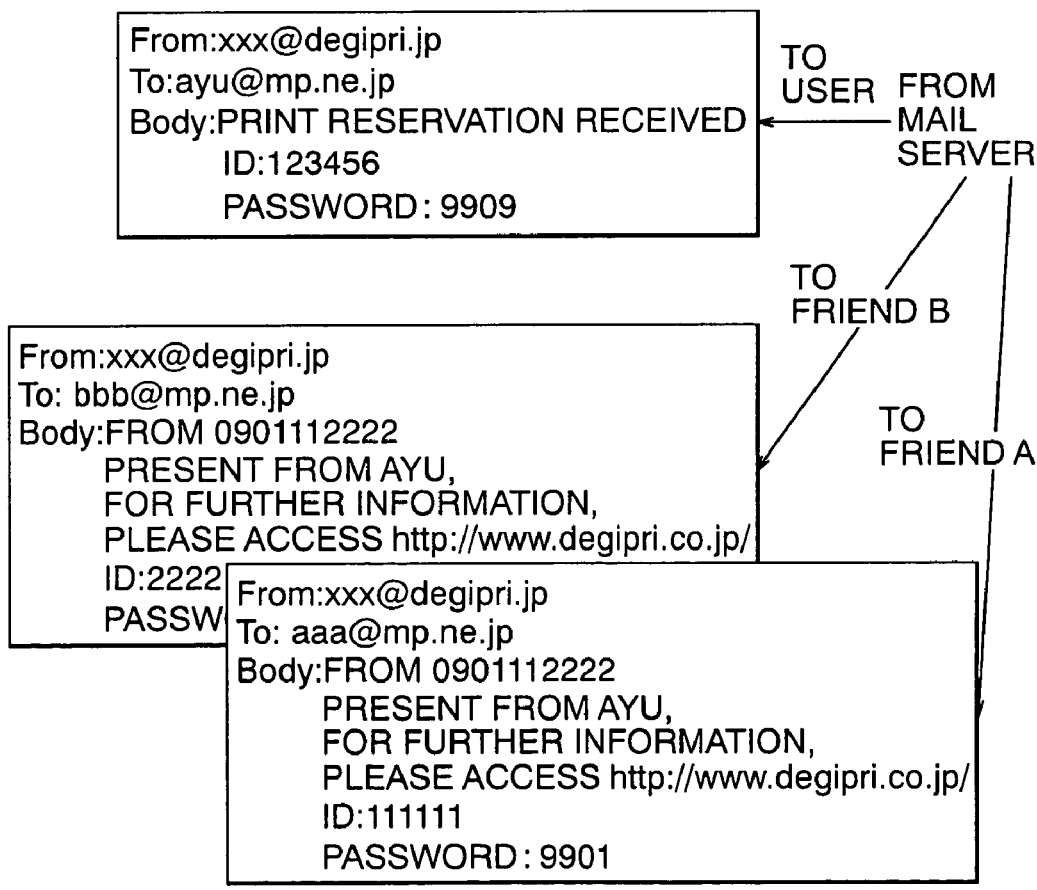

PRINT SERVICE SYSTEM

BACKGROUND OF THE INVENTION

1. Field of the Invention

The present invention relates to a print service system, and more particularly to a print service system for printing an image taken by a mobile telephone with a camera.

2. Description of the Related Art

As a conventional print service system, there is such a type that attached data, which cannot necessarily be recognized by all mobile telephones or mobile devices, is printed using a nearest printer connected with a wide area network. A user may use a convenient printer such as one installed close to the user (for example, refer to JP 2002-041422 A).

According to JP 2002-041422 A, a mail server informs a mobile telephone of receipt of an electronic mail with attached data, and transmits the attached data and a user ID which are extracted from the electronic mail to a print server. The print server managing a plurality of printers includes a data storage unit for storing the received attached data and user ID, and a data storing and retrieving unit. When the user ID is inputted to one of the plurality of printers, the corresponding printer informs the printer server of the inputted user ID. The printer server retrieves attached data corresponding to the informed user ID, transfers it to the printer, and causes the printer to print the data. Note that, with respect to a user ID input method, in order to inform of a position even when a mobile telephone is on standby, a very weak radio wave including information related to a telephone number is normally transmitted from the mobile telephone to a base station. Thus, when the printer receives the transmitted radio wave, the telephone number is obtained as a user ID.

The conventional print service system disclosed in JP 2002-041422 A is constructed as described above. Thus, when an image taken by, for example, a mobile telephone with a camera is to be printed, it is required for a user to transmit to oneself a mail to which the image is attached, receive the body of the mail and a processing confirmation mail, and reply an attached-data necessity mail to a server. Therefore, there is a problem in that the number of exchange of information between the mobile telephone and the server is large, the minimum number of transmission from the mobile telephone is required to be two, thereby taking time and effort for a user. In addition, only when the user brings a mobile telephone having no battery exhaustion and storing the received mail and inputs a user ID, data of an image for which printing becomes possible by the above processing is transferred to a printer. Thus, when the mobile telephone is forgotten to bring or when the battery is exhausted, printing is impossible. In addition, printing simultaneously conducted by third parties located in remote locations or plural persons at completely different locations is impossible. As a result, there is a problem in that the system has few advantages and it is inconvenient. Further, when a method of receiving a very weak radio wave transmitted from the mobile telephone is used as a user ID input method, there is a problem in that a printer becomes expensive to manufacture.

SUMMARY OF THE INVENTION

The present invention has been made in order to solve the above-mentioned problems, and an object thereof is to obtain a print service system capable of printing an image at a low cost in a desirable area by only attaching the image to an electronic mail and transmitting it to a mail server.

According to the present invention, there is provided a print service system which includes: electronic mail receiving means connected with a network, for receiving an electronic mail including attached image data transmitted from a user through the network; user designation managing means for making a user ID and a password for a mail address used by the user, and transmitting the user ID and the password to the mail address; data accumulating means for storing image data received by the receiving means for each user ID. The print service system also includes at least one print means connected with the network, for downloading the image data from the data accumulating means through the network when the user ID and the password are inputted, and printing the image data.

Therefore, it becomes possible to print an image by means of the print means at a low cost in a desirable area by only attaching the image to an electronic mail and transmitting it to the electronic mail receiving means disposed in a mail server.

BRIEF DESCRIPTION OF THE DRAWINGS

In the accompanying drawings:

FIGS. 3A and 3B are explanatory views indicating examples of a screen of a mobile telephone with a camera used for the print service system according to Embodiment 1 of the present invention;

FIG. 6 is a flow chart indicating a flow of processing of a print service system according to Embodiment 2 of the present invention; and FIGS. 7A and 7B are explanatory views indicating examples of a screen of a mobile telephone with a camera used for the print service system according to Embodiment 2 of the present invention.

DETAILED DESCRIPTION OF THE PREFERRED EMBODIMENTS

Embodiment 1

Figure 1:
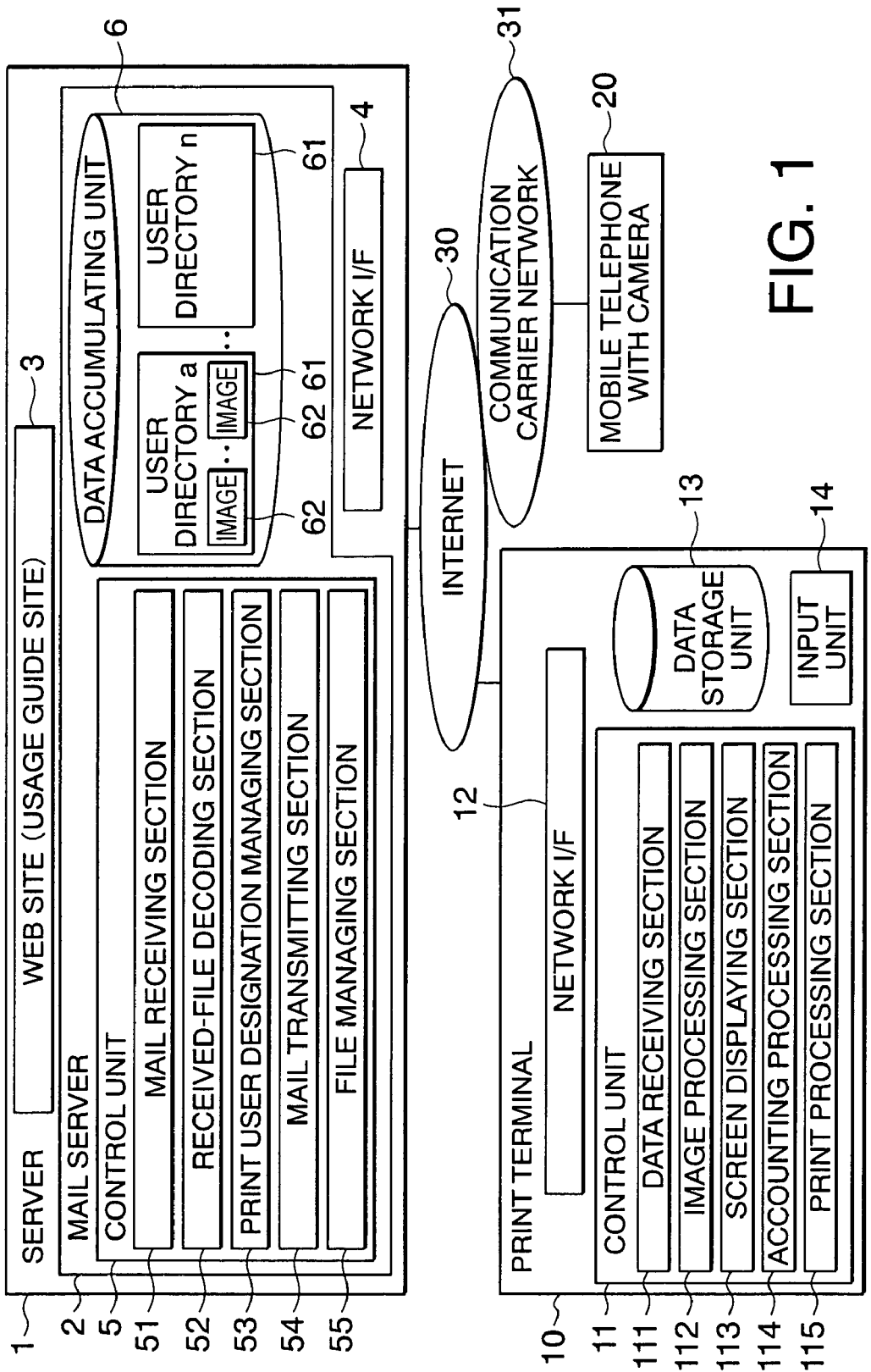
FIG. 1 is a configuration diagram indicating the entire configuration of a print service system of the present invention.

First, a configuration of a print service system of the present invention will be described with reference to a configuration diagram of FIG. 1. As shown in FIG. 1, a server 1 and a print terminal 10 are connected with each other through a wide area network such as Internet 30. In addition, they are connected with a mobile telephone with camera 20 through a communication carrier network 31 and the Internet 30.

In the server 1, a mail server 2, a web site (usage guide site) 3, and a network interface 4 for conducting communication exchange through the Internet 30 are provided. A control unit 5 and a data accumulating unit 6 are provided in the mail server 2. The control unit 5 is composed of a mail receiving section 51 for receiving an electronic mail including attached image data, a received-file decoding section 52 for separating the attached image data from the electronic mail and decoding it, a print user designation managing section 53 for making a user ID, a password, and a user directory based on the mail address of a source, a mail transmitting section 54 for transmitting the user ID and the password to the mail address of the source using an electronic mail, and a file managing section 55 for managing image data stored in user directories. Note that a plurality of user directories (a, . . . , n) 61 made corresponding to respective users are provided in the data accumulating unit 6, and images 62 are stored therein.

In the print terminal 10, a control unit 11, a network interface 12, a data storage unit 13, and an input unit 14 are provided. The control unit 11 is composed of a data receiving section 111 for receiving image data downloaded from the data accumulating unit 6, an image processing section 112 for processing the downloaded image data, a screen displaying section 113 for previewing the processed image data, an accounting processing section 114 for conducting accounting processing with respect to printing of the corresponding image data, and a print processing section 115 for printing the corresponding image data.

Figure 2:
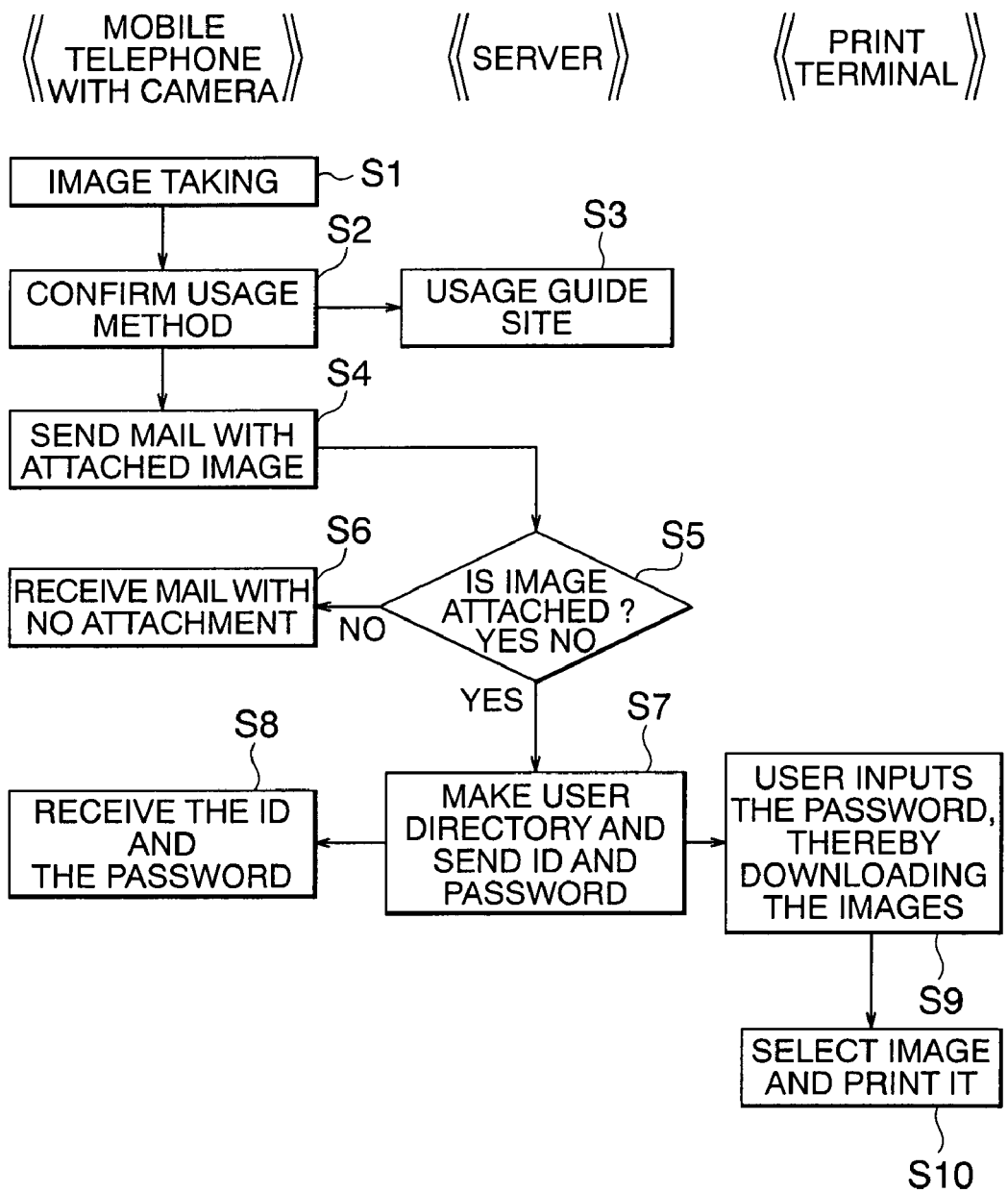
FIG. 2 is a flow chart indicating a flow of processing of a print service system according to Embodiment 1 of the present invention.

Next, the operation will be described. FIG. 2 shows a flow of processing. The web site 3 is a web site corresponding to each mobile telephone carrier, and accessed through the Internet by a user desiring the use of a print service according to the present invention. When a user accesses this site, a usage guide screen including information related to an installation location of the print terminal 10 is displayed on a screen of the mobile telephone 20 held by the user. Note that, the example in which the web site 3 is located in the server 1 is shown in FIG. 1, and the web site 3 and the mail server 2 are coexisted in the server 1. However, the present invention is not limited to this case. They may be independently located. First, a user takes a desirable image using the mobile telephone with camera 20 (Step S1). Next, a usage method is checked with the usage guide screen of the web site 3 (Steps S2 and S3), the image taken by the mobile telephone with camera 20 is attached as a mail attachment to an electronic mail in accordance with the guiding information, and the electronic mail is transmitted to the mail server 2 (Step S4). FIG. 3A shows a screen example of the mobile telephone 20 in the case where an electronic mail with an attached image is transmitted. As shown in FIG. 3A, a one's mail address, a mail address of the mail server 2, a subject for specifying an image by a user, and a file name of the attached image data are described. Thus, the mail server 2 receives the electronic mail by the mail receiving section 51. The mail receiving section 51 determines whether or not an image is attached to the received electronic mail (Step S5). If it is not attached, processing goes to Step S6, and an electronic mail with a massage indicating receipt of an electronic mail to which no image is attached is transmitted to the mobile telephone with camera 20. When the image is attached, the received-file decoding section 52 extracts an attached file from the electronic mail and decodes it (conversion of a text into an image file). The print user designation managing section 53 makes a user ID, a password, and a user directory 61 based on the mail address of a source (when the user ID based on the mail address is already existed, the user ID, the password, and the user directory which are already existed are used) (Step S7). Next, the image file is stored in the user directory 61 of the data accumulating unit 6 by the file managing section 55. The user directory 61 is made for each user and the image data stored therein is managed according to the user ID and the mail address of the user. Next, the user ID and the password are transmitted using an electronic mail from the mail transmitting portion 54 to the user and received by the mobile telephone 20 (Step S8). FIG. 3B shows an example of a screen of the mobile telephone 20 in the case where the corresponding electronic mail is received.

Figure 4:
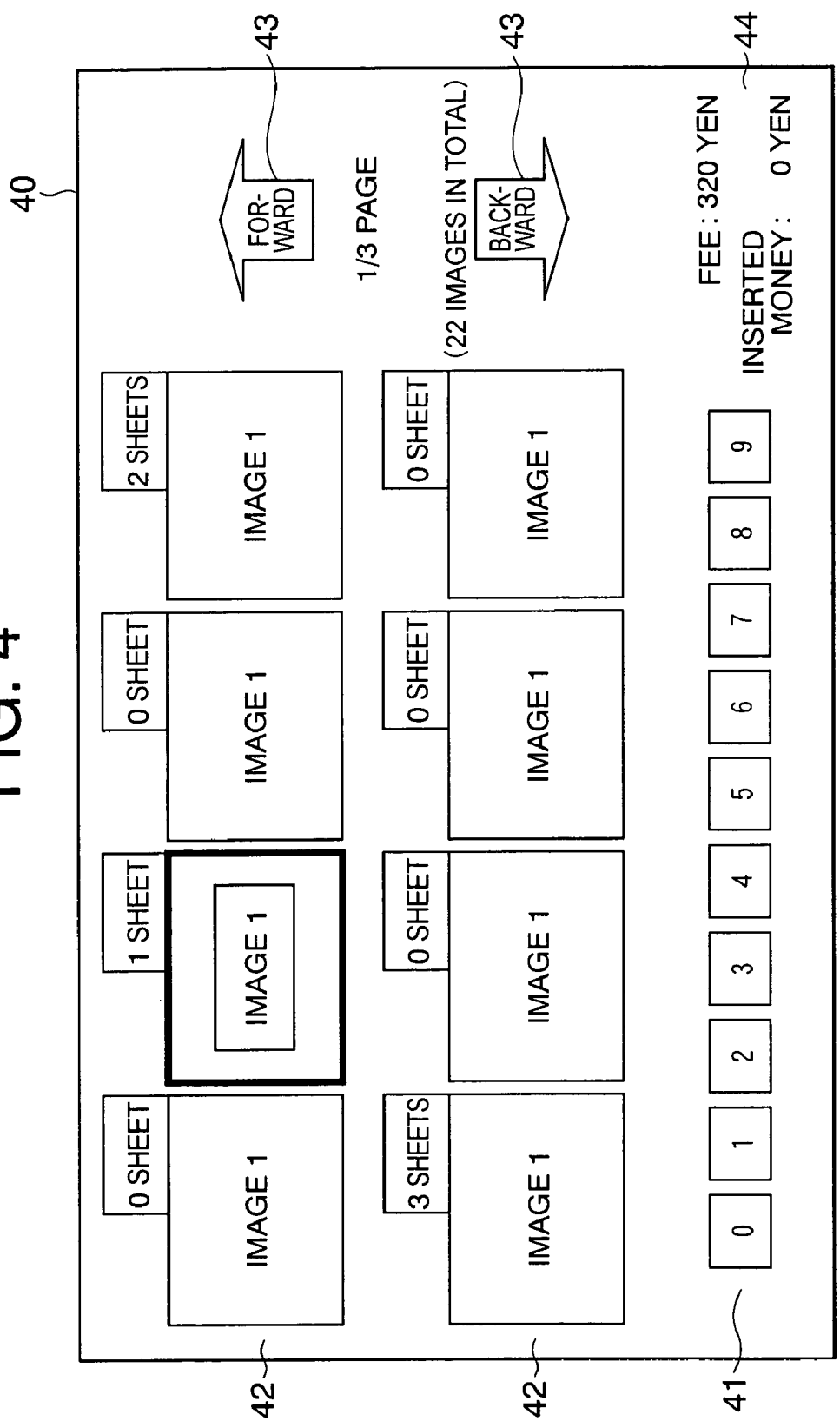
FIG. 4 is an explanatory view indicating an example of a screen of a print terminal provided to the print service system according to Embodiment 1 of the present invention.
Figure 5:
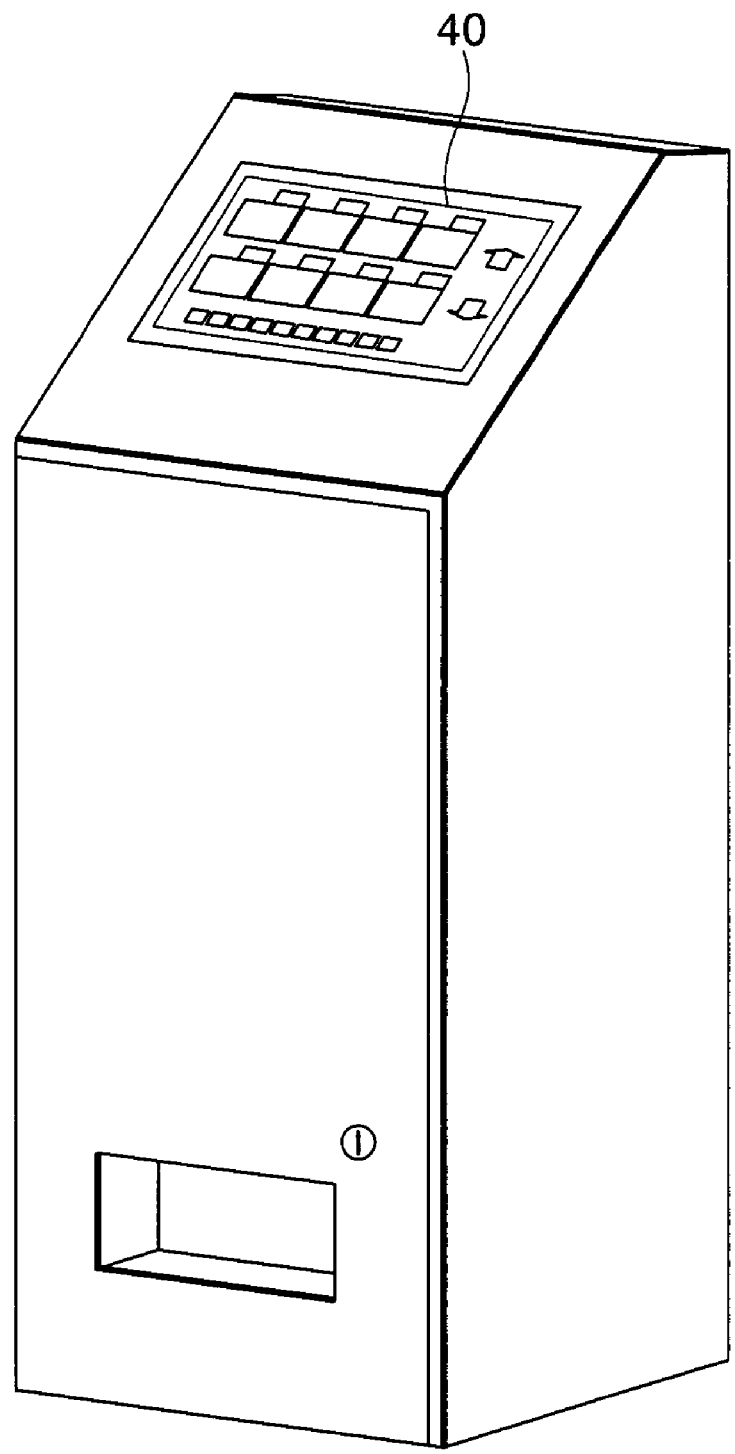
FIG. 5 is a perspective view indicating an example of an outline of the print terminal provided to the print service system according to Embodiment 1 of the present invention.

Therefore, the image in the user directory a 61 can be printed using the print terminal 10 according to two information, the user ID and the password. The print terminal 10 is connected with the server 1 through the Internet 30. When a notification mail including the user ID and the password is received, the user views the web site 3 to check a set location of the print terminal 10 and goes to the corresponding set location. It is desirable that a plurality of users freely make a stop at the print terminal 10 and can use it. Thus, it is located in, for example, a store such as a convenience store, a supermarket, or a department store, a DPE shop, a station yard, or the like. FIG. 4 shows an example of a screen of the print terminal 10 and FIG. 5 shows an example of an outline of the print terminal 10. A screen 40 of the print terminal 10 is composed of a touch panel and the like. As shown in FIG. 4, a ten-key pad 41 for inputting a user ID and a password, preview portions 42 for displaying one or more images (eight images in the example shown in FIG. 4) and causing a user to directly touch with a finger any screen for which printing is desired, page feed buttons 43 for switching a screen to a previous page or a next page, and an account displaying portion 44 for displaying a printing fee and input money are displayed. They compose the input unit 14 shown in FIG. 1.

It is returned to the description related to FIG. 2. When the user reaches the print terminal 10 and the user ID and the password which have been transmitted with the electronic mail from the server 2 are inputted using the ten-key pad 41 of the input unit 14 of the print terminal 10, the data receiving section 111 of the print terminal 10 downloads all image files in the user directory a 61 of the data accumulating unit 6 on the server 1 to the print terminal 10 and causes the data storage unit 13 to store them (Step S9). The downloaded image files are adjusted in size by the image processing section 112 and displayed as thumbnail images on the screen displaying section 113 (that is, a plurality of images are simultaneously displayed as shown in FIG. 4). While the images are previewed on the screen displaying section 113, the user conducts the selection of an image to be printed and the designation of a count and a size. Specifically, the user directly touches any one of images on the preview portions 42 with a finger to select an image. After that, the user designates a printing count and a size using the ten-key pad 41. In addition, when the user inserts money corresponding to a fee which is calculated by the accounting processing section 114 and displayed on the account displaying portion 44 of the screen 40, into a coin slot of the print terminal 10, the print terminal 10 prints the corresponding image by the print processing section 115 (Step 10). Note that the image files in the data accumulating unit 6 are deleted after a lapse of a predetermined period from storing by the control of the file management section 55 in the control unit 5 of the server 1. Thus, the corresponding image can be printed multiple times during the predetermined period.

As described above, according to this embodiment, the web site 3 for each mobile telephone carrier is made, and the image taken by the mobile telephone with camera 20 is transmitted as a file attached to an electronic mail, from the site 3 to the designated mail server 2. Then, the user ID and the password are replied from the mail server 2 side to an image transmitting person (user). When the user goes to the set location of the print terminal 10 which is described in the web site 3 and inputs the user ID and the password to the touch panel of the print terminal 10, the image which is attached to the electronic mail and transmitted can be automatically downloaded, so that an image to be printed can be selected at the location and printed. Therefore, the image taken by the mobile telephone with camera can be easily printed at a low cost in an area meeting the convenience of the user, so that it is convenient. In addition, when the touch panel is used, operability is superior.

Also, when the user accesses the web site 3, if it is set such that the preview portions 42 displayed on the screen shown in FIG. 4 can be displayed on the screen of the mobile telephone 20, the screen of a personal computer, or the like through the Internet 30, the user can check whether or not a desirable image is stored in the data accumulating unit 6 in advance before the user goes to the location of the print terminal 10. Thus, the convenience is improved.

Embodiment 2

When the user ID and the password which are described in Embodiment 1 are informed to a third party, an image can be printed for the third party as in the case of the user. Therefore, in this embodiment, an example in which the mail server 2 transmits the user ID and the password to one or more third parties designated by the user will be described. Note that the entire configuration of a print service system is the same as shown in FIGS. 1, 4, and 5. Thus, these drawings are referred to and the descriptions are omitted here.

FIG. 6 shows a flow of processing in this embodiment. In FIG. 6, the same reference symbols are given to the same processing as that shown in FIG. 2 and the descriptions are omitted here. After Steps S1 to S3, in Step S4A, when the image data is sent, the mail addresses of third parties such as friends except the user are written into the body of an electronic mail as shown in FIG. 7A. Thus, in Step S7A, when the mail server 2 transmits the user ID and the password to the mobile telephone 20, the user ID and the password are simultaneously transmitted to the third parties except the user which are designated by the user in Step S4A. Thus, the third parties designated by the user receive the user ID and the password (Step S8A). FIG. 7B shows examples of the screens of the mobile telephones on which the electronic mails received by the user and the third parties are displayed.

Note that, in order to reduce a load of processing, the user ID and the password which are transmitted to the user may be the same as those transmitted to the third parties. In view of security, they may be changed for each user. In addition, the user ID and the password are random numbers generated in the server 1 and composed of, for example, a 6-digit number and a 4-digit number, respectively. Thus, when they are inputted to the print terminal 10, ten-key input is possible, so that time and effort of operation for a user are reduced.

As described above, according to this embodiment, when the user transmits the image to the mail server 2, the user writes the mail addresses of the third parties such as friends into the body. Thus, the user ID and the password are simultaneously sent to the friends and the like of the written mail addresses without informing the user ID and the password from the user to the third parties after the user receives them. Accordingly, the image can be simultaneously and easily printed at a low cost for a plurality of persons in completely different locations meeting the conveniences of the respective persons as in the case of the user oneself, so that attached data can be commonly used.

Note that, with respect to another method capable of printing for a third party, except the above method, the user ID and the password which have been replied by sending to a mail server image data as a mail attachment in the same processing as in Embodiment 1 may be manually informed from the user to the third party using an electronic mail or through a telephone call.

What is claimed is:

1. A print service system comprising:
an electronic mail receiving unit connected with a network, said receiving unit receives an electronic mail including attached image data transmitted from a user through the network;
a print user designation managing unit that creates, in response to the received electronic mail transmitted from said user, a user ID and a password and a directory for a mail address used by said user, and transmits said user ID and said password to said mail address;
data accumulating unit that stores image data received by said electronic mail receiving unit for each user ID in said directory; and
at least one print terminal connected with the network, for downloading said image data from said data accumulating unit through the network when said user ID and said password are inputted, and printing said image data,
wherein when a mail address of a third party except said user is described in a body of the electronic mail received by said electronic mail receiving unit, said user designation managing unit transmits a user ID and a password to said mail address of the third party simultaneously with transmitting said user ID and said password to said mail address of the user, and wherein the user directory is created for the user and said image data stored in said directory is managed according to the user ID and the mail addresses of the user and is printed according to the user ID and the passwords of the third party and the user.

2. A print service system according to claim 1, further comprising usage guide displaying unit connected with the network that displays a usage guide including information related to an installation location of said print terminal.

3. A print service system according to claim 1, wherein:
said print terminal includes a touch panel; and
said user ID and said password are inputted from an input unit composed of a ten-key pad which is displayed on said touch panel.

4. A print service system according to claim 1, wherein said user ID and said password which are transmitted to said mail address of said third party are identical to said user ID and said password which are transmitted to said user's mail address.

5. A print service system according to claim 1, wherein said user ID and said password which are transmitted to said mail address of said third party are different from said user ID and said password which are transmitted to said user's mail address.

6. A non-transitory computer-readable storage medium having stored thereon computer executable program for causing a computer connected through a network with a print terminal which performs authentication using a user ID and prints designated image data, the computer program when executed causes the computer to execute:
an electronic mail reception step for receiving an electronic mail including attached image data transmitted from a user through the network;
a user ID creation step for creating, in response to the received electronic mail transmitted from said user, a user ID for a mail address used by the user;
a user ID transmission step for transmitting the user ID to the mail, address; and a data accumulation step for storing the attached image data onto a directory for each user ID, wherein when a mail address of a third party except said user is described in a body of the electronic mail received by said electronic mail reception step, said user ID transmission step transmits a user ID and a password to said mail address of the third party simultaneously with transmitting said user ID to said mail address of the user, and wherein the user directory is created for the user and said image data stored in said directory is managed according to the user ID and the mail addresses of the user and is printed according to the user ID and the passwords of the third party and the user.

7. A non-transitory computer-readable storage medium having stored thereon computer executable program for causing a computer connected through a network with a print terminal which performs authentication using a user ID and prints designated image data, the computer program when executed causes the computer to execute:

an electronic mail reception step for receiving an electronic mail including attached image data transmitted from a user through the network;

a user ID creation step for creating, in response to the received electronic mail transmitted from said user, a user ID for one of the attached image data and the electronic mail;

a user ID transmission step for transmitting the user ID to a mail address used by the user; and a data accumulation step for storing the attached image data onto a directory for each user ID, wherein when a mail address of a third party except said user is described in a body of the electronic mail received by said electronic mail reception step, said user ID transmission step transmits a user ID and a password to said mail address of the third party simultaneously with transmitting said user ID to said mail address used by the user, and wherein the user directory is created for the user and said image data stored in said directory is managed according to the user ID and the mail addresses of the user and is printed according to the user ID and the passwords of the third party and the user.

8. A non-transitory computer-readable storage medium having stored thereon computer executable program for causing a computer connected through a network with a print terminal which performs authentication using a user ID and prints designated image data, the computer program when executed causes the computer to execute:

an electronic mail reception step for receiving an electronic mail including attached image data transmitted from a user through the network;

a judgment step for judging, in response to the received electronic mail transmitted from said user, whether or not a mail address of a third party is described in a body of the electronic mail received;

a user ID creation step for creating a user ID and a password for a mail address used by the user and the mail address of the third party when it is judged that the mail address of the third party is described in said judgment step;

a user ID transmission step for transmitting the user ID and the password which are made in the user ID creation step to the mail address from which the electronic mail including the attached image data is transmitted by the user and the mail address of the third party; and a data accumulation step for storing the attached image data onto a directory for each user ID, wherein when it is judged that the mail address of the third party except said user is described in said judgment step, said user ID transmission step transmits a user ID and a password to said mail address of the third party simultaneously with transmitting said user ID and said password which are made in the user ID creation step to the mail address from which the electronic mail including the attached image data is transmitted by the user and the mail address of the third party, and wherein the user directory is created for the user and said image data stored in said directory is managed according to the user ID and the mail addresses of the user and is printed according to the user ID and the passwords of the third party and the user.

9. A non-transitory computer-readable storage medium according to claim 8, wherein the user ID and the password which are transmitted to the mail address of the other user are identical to the user ID and the password which are transmitted to the mail address of the user.

10. A non-transitory computer-readable storage medium according to claim 8, wherein the user ID and the password which are transmitted to the mail address of the other user are different from the user ID and the password which are transmitted to the mail address of the user.

* * * * *